(12) United States Patent
Vessey (10) Patent No.: US 11,937,730 B2
(45) Date of Patent: Mar. 26, 2024

(54) VACUUM INFUSION PRODUCER AND METHOD

(71) Applicant: Richard Allen Vessey, Olympia, WA (US)

(72) Inventor: Richard Allen Vessey, Olympia, WA (US)

( * ) Notice: Subject to any disclaimer, the term of this patent is extended or adjusted under 35 U.S.C. 154(b) by 327 days.

(21) Appl. No.: 17/300,503

(22) Filed: Jul. 22, 2021

(65) Prior Publication Data

US 2023/0028821 A1    Jan. 26, 2023

(51) Int. Cl.
*A47J 31/02* (2006.01)
*A23F 3/18* (2006.01)
*A23F 5/26* (2006.01)
*A47J 31/06* (2006.01)

(52) U.S. Cl.
CPC ............ *A47J 31/02* (2013.01); *A23F 3/18* (2013.01); *A23F 5/26* (2013.01); *A47J 31/06* (2013.01)

(58) Field of Classification Search
CPC ... A47J 31/02; A47J 31/06; A23F 3/18; A23F 5/26
See application file for complete search history.

(56) References Cited

U.S. PATENT DOCUMENTS

| | | | | |
|---|---|---|---|---|
| 1,365,443 A | * | 1/1921 | Anhaltzer | A23F 5/483 99/290 |
| 2,489,785 A | * | 11/1949 | Kershaw | A47J 31/043 210/477 |
| 2,571,015 A | * | 10/1951 | Columbus | A47J 31/043 277/928 |
| 2,604,031 A | * | 7/1952 | Campbell | A47J 31/053 99/308 |
| 2,997,940 A | * | 8/1961 | Pecoraro | A47J 31/10 99/317 |
| 3,696,733 A | * | 10/1972 | Beverett | A47J 31/0573 99/315 |
| 5,215,128 A | * | 6/1993 | Neeser | B67D 1/1245 141/105 |
| 5,309,820 A | * | 5/1994 | Baxter | G07F 13/065 D7/400 |
| 5,913,963 A | * | 6/1999 | King | A47J 31/18 99/287 |
| 5,942,143 A | * | 8/1999 | Hartman | A47J 31/547 219/689 |

(Continued)

FOREIGN PATENT DOCUMENTS

CN    209809584    * 12/2019

*Primary Examiner* — Anthony J Weier (57) ABSTRACT

A vacuum chambered beverage producer with an upper hopper and a lower hopper stacked together to create separate sealed chambers. The upper hopper has a flavor adjustment valve and the lower hopper has a flavor adjustment valve attached near drain holes which can be adjusted to open or close to any size of diameter to increase or decrease the strength and flavor of a finished flavored beverage produced therein. The lower hopper has a breather trough, a recessed area generally located on the bottom of the lower hopper, so that it can fit onto various sizes of receptacles making it universal to many applications. The stackable beverage producer further having a removable lid with a hole generally located in the middle of the lid with a lid hole cover that opens or closes the hole to any size of diameter, and a removable base used in the storage mode.

2 Claims, 6 Drawing Sheets

(56) References Cited

U.S. PATENT DOCUMENTS

| | | | | |
|---|---|---|---|---|
| 6,079,314 | A * | 6/2000 | Mackinnon | A47J 31/60 99/289 R |
| 8,778,432 | B2 * | 7/2014 | Lown | A23F 3/00 426/597 |
| 2010/0001007 | A1 * | 1/2010 | Ferraro | A47J 43/22 220/23.88 |
| 2010/0154459 | A1 * | 6/2010 | Skalski | A47J 31/0668 62/389 |
| 2010/0278988 | A1 * | 11/2010 | Radosav | A47J 31/18 99/302 R |
| 2014/0251150 | A1 * | 9/2014 | Vessey | A47J 31/4403 99/289 R |
| 2019/0274471 | A1 * | 9/2019 | Itzkowitz | A47J 31/32 |
| 2020/0359826 | A1 * | 11/2020 | Umana | A47J 31/02 |
| 2021/0401218 | A1 * | 12/2021 | Kalenian | A47J 31/0663 |
| 2022/0356421 | A1 * | 11/2022 | Vastardis | C12G 3/04 |

\* cited by examiner

VACUUM INFUSION PRODUCER AND METHOD

CROSS-REFERENCE TO RELATED APPLICATIONS

Non-Applicable

STATEMENT REGARDING FEDERALLY SPONSORED RESEARCH OR DEVELOPMENT

Non-Applicable

REFERENCE TO SEQUENCE LISTINGS, A TABLE, OR A COMPUTER PROGRAM LISTING COMPACT DISK APPENDIX

Non-Applicable

BACKGROUND OF INVENTION

The present invention is in the technical field of flavored beverage producers. More particularly the present invention is in the technical field of a new process device that creates its own vacuum from the flow of a liquid, inside of sealed chambers, to extract more flavors and vitamins from food products to produce a finished flavored beverage in minutes instead of hours like infusers used at the present time. The infusers used today don't have a way to control the amount of flavor that is infused into a liquid and take hours or days to infuse liquids with food product flavors. This is a new and useful process for infusing a liquid with flavors from food products by creating a vacuum in a sealed chamber that extracts more nutrients and vitamins than other infusers or brewers in the market place today. The sealed chambers have vacuum control valves that increase or decrease the vacuum to adjust the flavor of the finished beverage. Most infusers just let food products soak in water for 2-4 hours and don't have any way to control how much flavor will be infused into the liquid. Using this vacuum control system you can control how much flavor you want infused into the liquid in 5 minutes or less. It is a useful improvement and a easier way to make a finished flavored beverage. There is nothing else on the market that uses a sealed chamber with vacuum control valves creating its own vacuum when a liquid is poured through its chambers to produce a finished flavored beverage that the consumer can enjoy just the way they want it.

There are allot of different flavored beverages in the stores, but I never found one that I liked. It's either too sweet, not sweet enough, not enough flavor, too strong of a flavor, etc. There are only certain flavors made and some use artificial flavors and preservatives so you can never be sure how long it's been on the shelf or how fresh it is.

Every type of infuser or brewer of modern day do not use a vacuum chamber that is created by a gravitational pull of the liquid flowing in a downward motion. This vacuum chamber which is created by a downward flow of liquid extracts the flavor from food products more efficiently and draws out more nutrients and vitamins than any infuser or brewer in todays market place. Infusers only let food products soak in water which creates a watered down flavored beverage and brewers just let water flow over food products which creates a stale tasting flavored beverage.

Advantages

Thus several advantages of one or more aspects of the vacuum chamber process only takes minutes instead of hours to complete. The sealed chambers create a vacuum which draws out the flavor of the food products used instead of the food products just soaking in a liquid like all the other infusers that are on the market.

The chambers have vacuum control valves that control the amount of vacuum that is inside the chambers to decrease or increase the flavor of the finished beverage. Other infusers do not have vacuum hoppers like this so the flavor infused with the liquid is diluted. This process of using vacuum chambers makes a more flavorful finished beverage and creates many different types of finished flavored beverages that other beverage producers can not produce making this a new and improved process with unexpected results.

Thus another aspect of the vacuum chambered beverage producer is the vacuum created draws out more vitamins and nutrients than other infusers which results in a healthier and more nutritious finished flavored beverage. It solves the problem of limited flavors and strengths of finished flavored beverages produced by all other infusers and brewers in the market place.

BRIEF SUMMARY OF THE INVENTION

Thus several advantages of one or more aspects of the present invention is that the consumer can produce any finished flavored beverage that the consumer desires, at what strength and flavor the consumer desires, with no artificial flavors or preservatives.

Another object of this invention is to be able to produce an inexpensive way of making a fresh finished flavored beverage at home in minutes instead of hours.

These and other advantages of one or more aspects will be apparent from a consideration of the ensuing detailed description and accompanying drawings.

BRIEF DESCRIPTION OF THE SEVERAL VIEWS OF THE DRAWINGS

The invention may take physical form in parts that are shaped differently and attached differently, a preferred embodiment is now made to the accompanying drawings wherein.

DETAILED DESCRIPTION OF THE INVENTION

Figure 1:
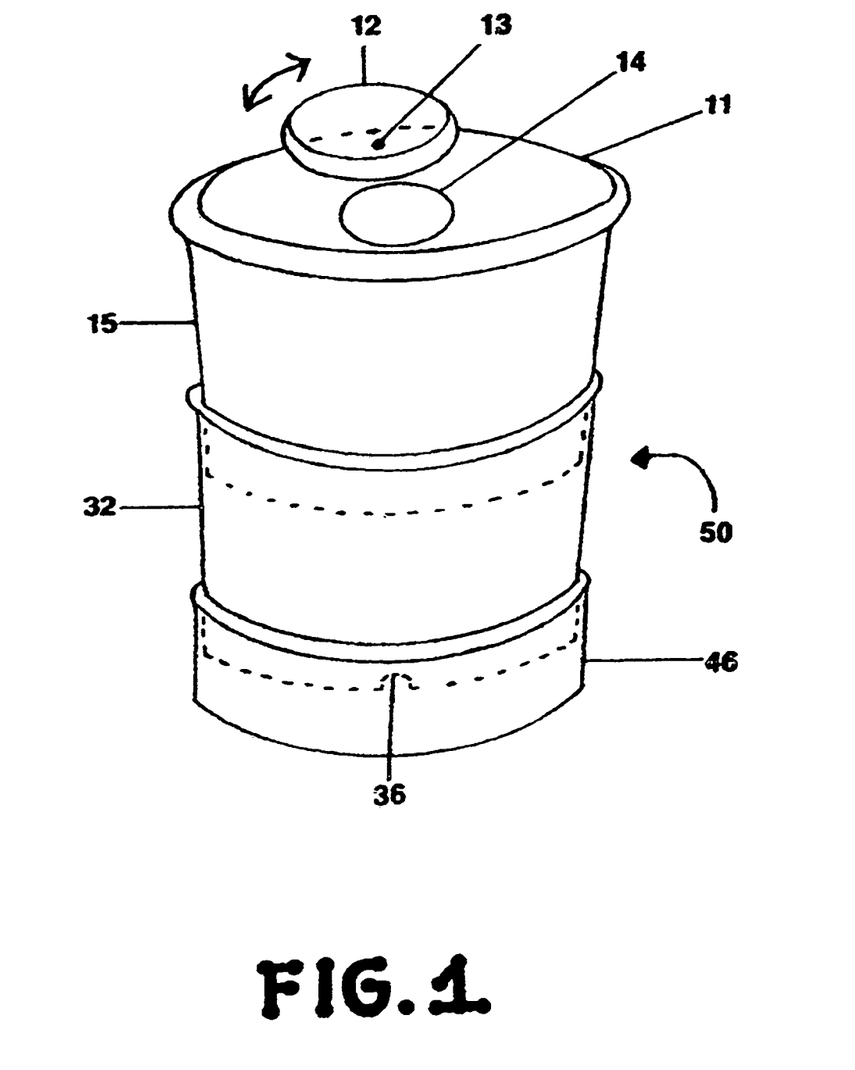
FIG. 1 is a perspective view of one version of the vacuum chambered beverage producer in storage mode.

Referring now to the drawings wherein the showings are for the purpose of illustrating a preferred embodiment of the present invention only and not for the purpose of limiting same, FIG. 1 shows a preferred embodiment of one version of the vacuum chambered beverage producer 50 in storage mode. The vacuum chambered beverage producer 50 generally comprises of a top chamber 15 a bottom chamber 32 and a removable lid 11. A removable base 46 is used in the storage mode as seen in FIG. 1. Lid 11 has a lid hole 14 generally located in the middle of lid 11. There is a vacuum control valve 12 which can be adjusted to close or open up hole 14. Cover 12 is attached to lid 11 by a fastening device 13. Lid 11 is placed on the top chamber 15. Top chamber 15 is placed on bottom chamber 32 then it is placed on base 46 to store away for a later use. A breather trough 36 is generally located on the bottom chamber 32.

Figure 2:
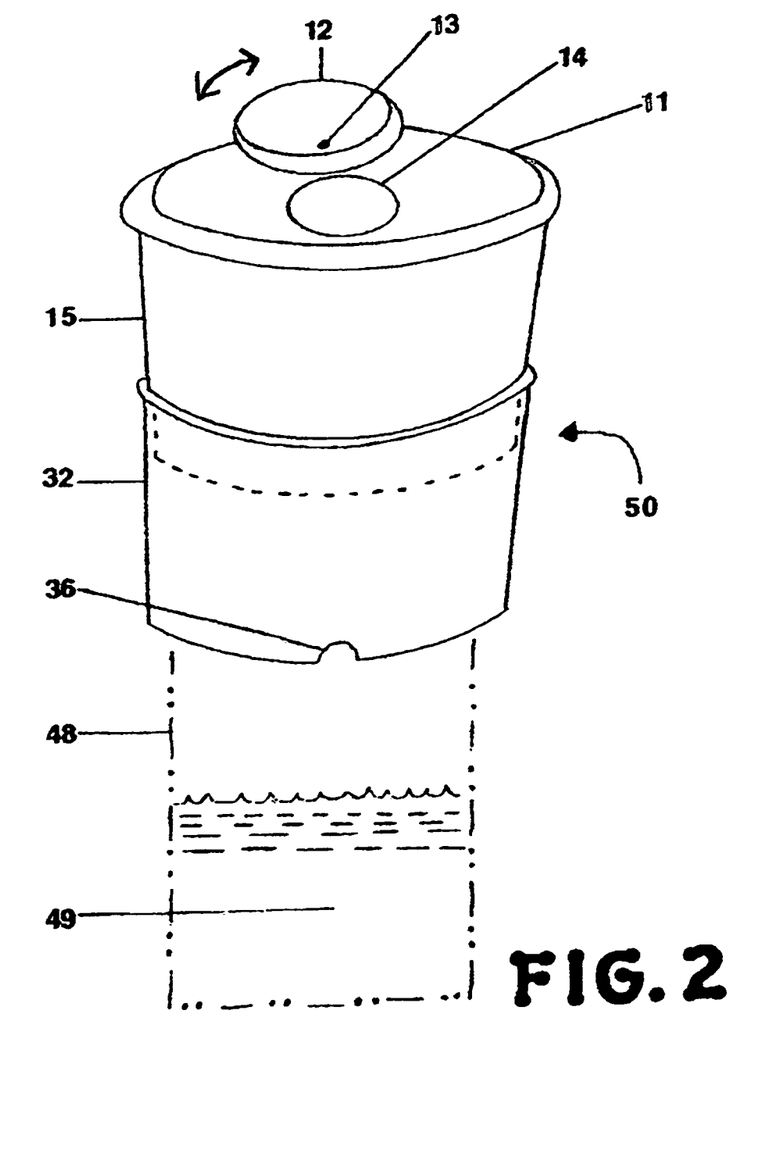
FIG. 2 is a perspective view of one way the vacuum chambered beverage producer can be used.

Referring now to FIG. 2 showing one way the vacuum chambered beverage producer 50 can be used. Lid 11 has hole 14 with a vacuum control valve 12 attached to lid 11 by a fastening device 13 sits on the top chamber 15 which gets stacked on the bottom chamber 32 to produce sealed chambers. The vacuum chambered beverage producer 50 sits on top of a receptacle 48 that can receive a finished flavored beverage 49. The top chamber 15 and the bottom chamber 32 have a cavity that is suitable for accepting tea, coffee or other food products and are generally sloped inward on the sides. Breather trough 36 which is a recessed area of a predetermined depth and length is generally located on the bottom chamber 32 and prevents the bottom chamber 32 from sealing to receptacle 48.

Figure 3A:
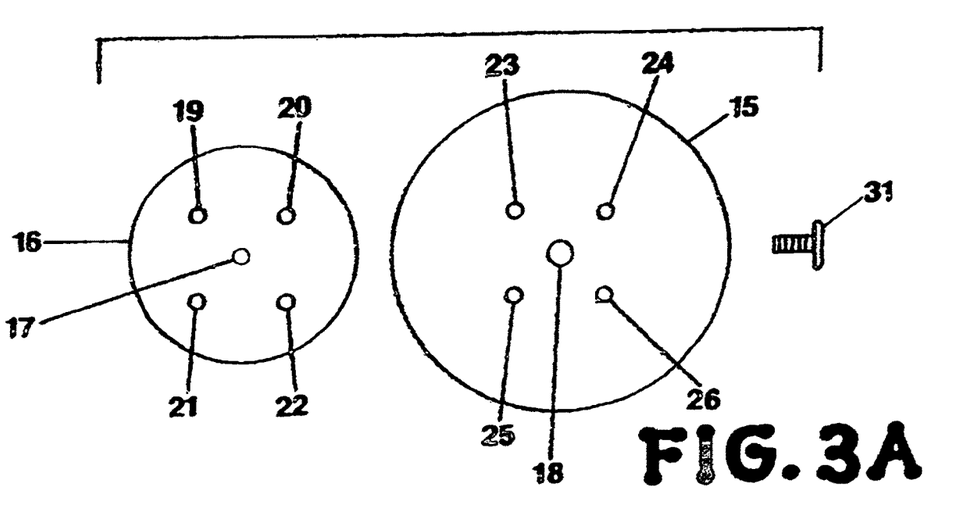
FIG. 3A is an exploded bottom view of the top chamber.
Figure 3B:
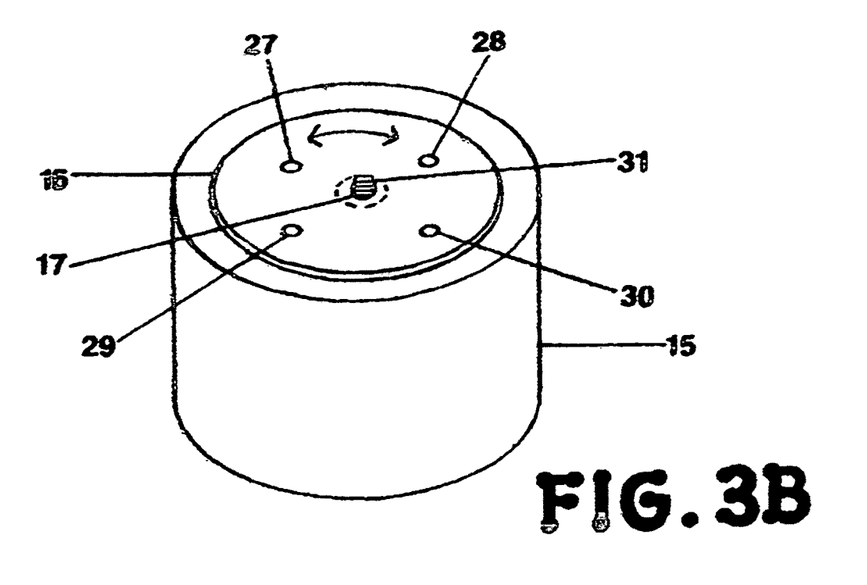
FIG. 3B is a perspective bottom view of FIG. 3A assembled.

Referring now to FIG. 3A which is an exploded bottom view of the top chamber 15. The top chamber 15 has drain holes 23, 24, 25 and 26 which lineup with drain holes 19, 20, 21 and 22 of the vacuum control valve 16. Vacuum control valve 16 has a threaded hole 17 which allows vacuum control valve 16 to be mounted to the bottom of the top chamber 15 by the threads of a threaded bolt 31 being pushed through the top chamber alignment hole 18 and screwed into threaded hole 17. The head of threaded bolt 31 stays on the inside of the top chamber 15 as shown in FIG. 3B Referring now to FIG. 3B which is a perspective bottom view of FIG. 3A assembled. When valve 16 is mounted to the bottom of the top chamber 15 by bolt 31 screwing into threaded hole 17 of vacuum control valve 16 drain holes 27, 28, 29 and 30 are lined up and can be adjusted to any size of diameter. Drain holes 27, 28, 29, 30 are the vacuum control valve 16 drain holes 19, 20, 21, 22 and the top chamber 15 drain holes 23, 24, 25, and 26 put together. The bottom of the top chamber 15 is sloped inward to a flat spot where the vacuum control valve 16 is located. The head of bolt 31 sits on the inside of the top chamber 15 so that it can allow the vacuum control valve 16 to be adjusted but still create a seal against the bottom of the top chamber 15.

Figure 4A:
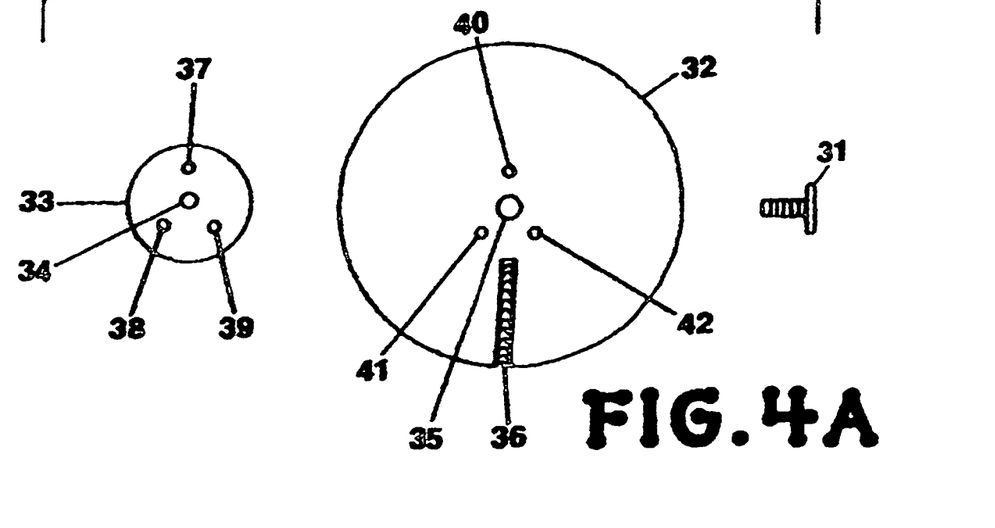
FIG. 4A is an exploded bottom view of the bottom chamber.
Figure 4B:
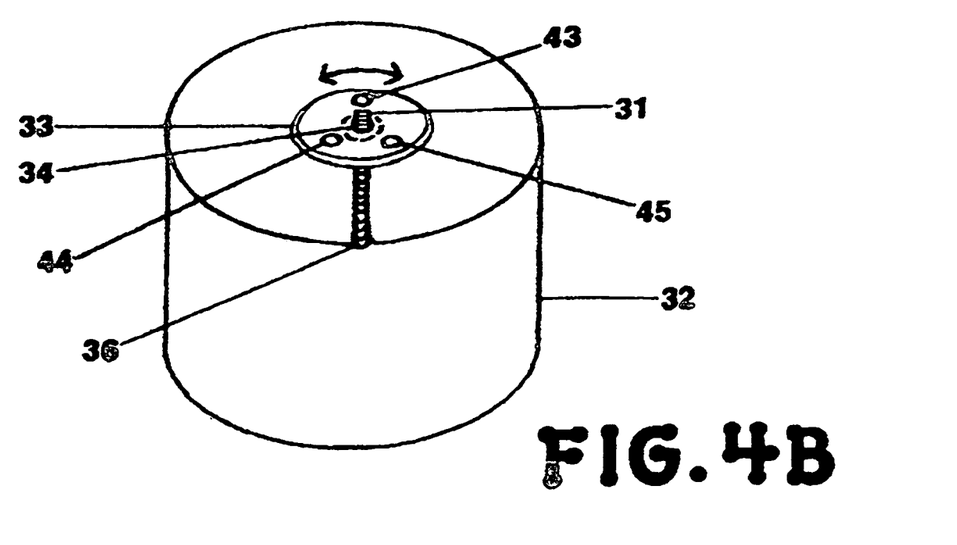
FIG. 4B is a perspective bottom view of FIG. 4A assembled.

Referring to FIG. 4A which is an exploded bottom view of the bottom chamber 32. The bottom chamber 32 has drain holes 40, 41 and 42 which line up with drain holes 37, 38 and 39 of the vacuum control valve 33. The vacuum control valve 33 has a threaded hole 34 which allows vacuum control valve 33 to be mounted to the bottom chamber 32 by the threads of bolt 31 being pushed through the bottom chamber alignment hole 35 and screwed into threaded hole 34. The head of threaded bolt 31 stays on the inside of the bottom chamber 32 as shown in FIG. 4B. The bottom chamber 32 has breather trough 36 which is a recessed area and is generally located on the bottom chamber 32.

Referring now to FIG. 4B which is a perspective bottom view of FIG. 4A assembled. When vacuum control valve 33 is mounted to the bottom chamber 32 by bolt 31 screwing into threaded hole 34 of vacuum control valve 33 drain holes 43, 44 and 45 are lined up and can be adjusted to any size of diameter. Drain holes 43, 44, 45 are vacuum control valve 33 drain holes 37, 38, 39 and the bottom chamber 32 drain holes 40, 41, and 42 put together. The bottom chamber 32 is sloped inward to a flat spot where valve 33 is located. The head of bolt 31 sits on the inside of the bottom chamber 32 so that it can allow the vacuum control valve 33 to be adjusted but still create a seal against the bottom chamber 32. The bottom chamber 32 has breather trough 36 which is a recessed area of a predetermined depth and length and is generally located on the bottom chamber 32 from the outside edge of the bottom chamber 32 up to the outside edge of valve 33. This makes the vacuum chambered beverage producer 50 adaptable to receptacle 48 of various sizes and shapes without causing a drainage problem.

Figure 5A:
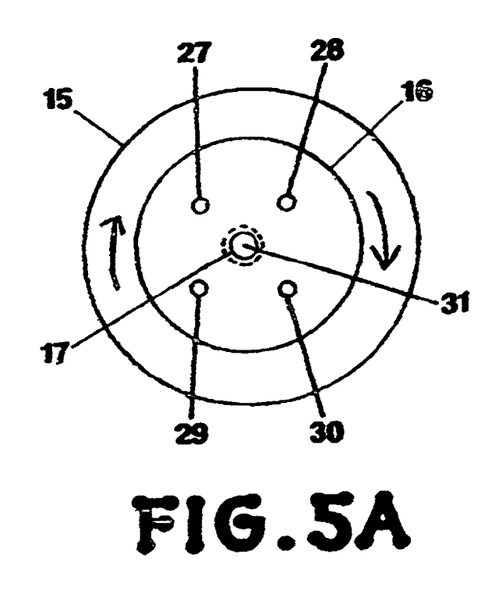
FIG. 5A is a bottom view of FIG. 3B with the top chamber vacuum control valve open and showing how it can be adjusted to close.
Figure 5B:
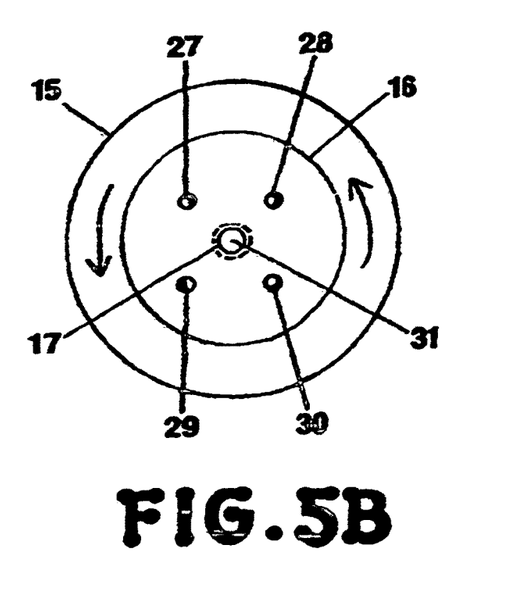
FIG. 5B is a bottom view of FIG. 3B with the top chamber vacuum control valve closed part way and showing how it can be adjusted to open.

Referring to FIG. 5A and FIG. 5B which is a bottom view of FIG. 3B shows how the vacuum control valve 16 is mounted to the top chamber 15 when bolt 31 is screwed into threaded hole 17 of the vacuum control valve 16 which creates drain holes 27, 28, 29 and 30. FIG. 5A illustrates one way that the vacuum control valve 16 can be adjusted so that drain holes 27, 28, 29 and 30 will close up to a predetermined size of diameter. FIG. 5B shows how the vacuum control valve 16 is closed part way and how the vacuum control valve 16 can be adjusted in the opposite direction so that drain holes 27, 28, 29 and 30 will open up to a predetermined size of diameter.

Figure 6A:
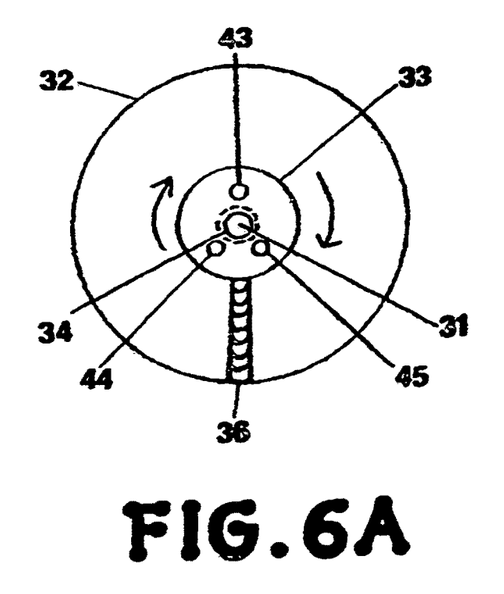
FIG. 6A is a bottom view of FIG. 4B with the bottom chamber vacuum control valve open and showing how can be adjusted to close.
Figure 6B:
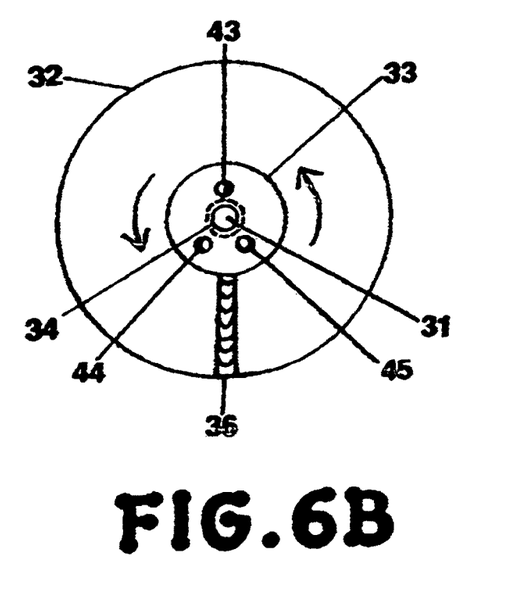
FIG. 6B is a bottom view of FIG. 4B with the bottom chamber vacuum control valve closed part way and showing how it can be adjusted to open.

Referring to FIG. 6A and FIG. 6B which is a bottom view of FIG. 4B showing how the vacuum control valve 33 is mounted to the bottom chamber 32 when bolt 31 is screwed into threaded hole 34 of the vacuum control valve 33 which creates drain holes 43, 44 and 45. FIG. 6A illustrates one way that the vacuum control valve 33 can be adjusted so that drain holes 43, 44 and 45 will close up to a predetermined size of diameter. FIG. 6B shows how the vacuum control valve 33 is closed part way and how the vacuum control valve 33 can be adjusted in the opposite direction so that drain holes 43, 44 and 45 will open up to a predetermined size of any diameter. FIG. 6A and FIG. 6B also shows breather trough 36 and how it might look if it was molded into the bottom chamber 32.

Figure 7A:
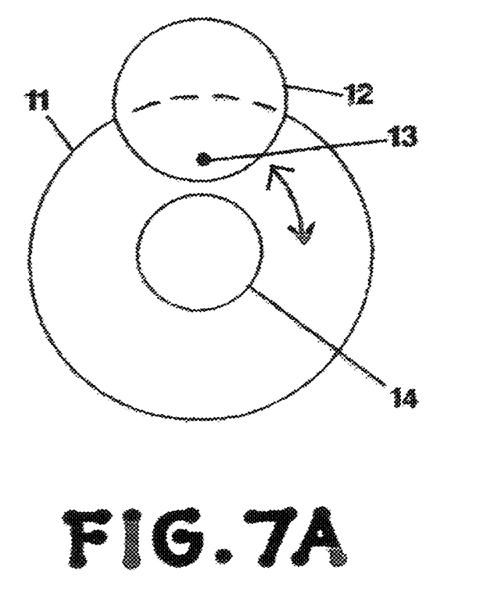
FIG. 7A is a top view of the removable lid with the vacuum control valve open and showing how it can be adjusted to close.
Figure 7B:
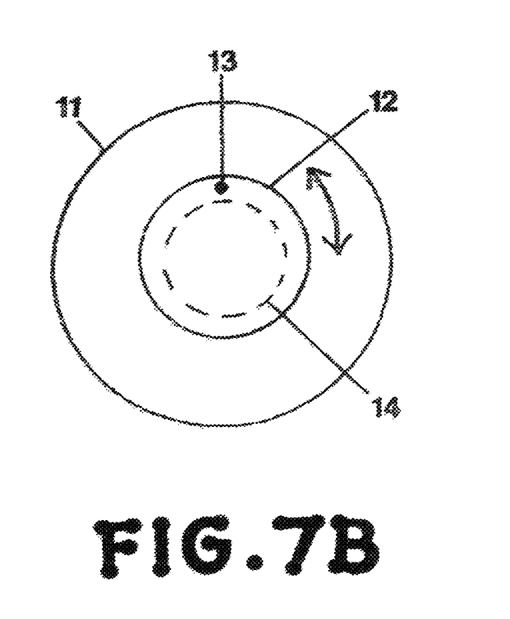
FIG. 7B is a top view of the removable lid with the vacuum control valve closed and showing how it can be adjusted to open.

Referring to FIG. 7A and FIG. 7B which is a top view of lid 11 and how the vacuum control valve 12 is attached to lid 11 by fasting device 13 which lets it move. FIG. 7A shows hole 14 open and how the vacuum control valve 12 is adjusted to close hole 14 while FIG. 7B shows hole 14 closed and how the vacuum control valve 12 is adjusted to open hole 14. The vacuum control valve 12 creates a seal on top of lid 11 when cover 12 is adjusted to the closed position as shown in FIG. 7B to help control vacuum forces inside the top chamber and bottom chamber.

Figure 8:
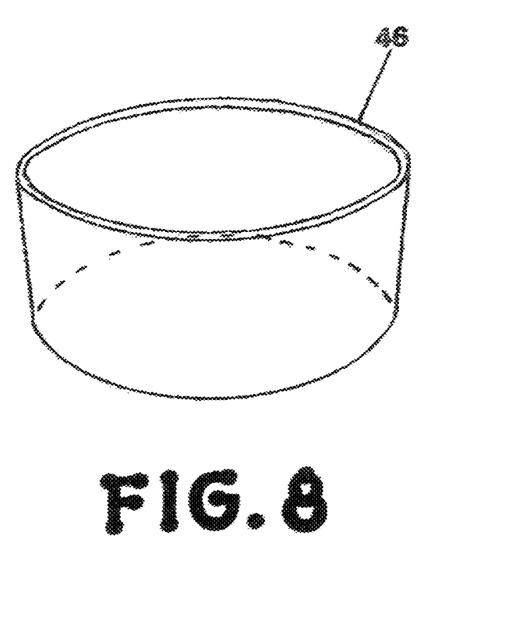
FIG. 8 is a perspective view of the removable base.

Referring to FIG. 8 which is a perspective view of base 46 and is used in the storage mode.

Figure 9:
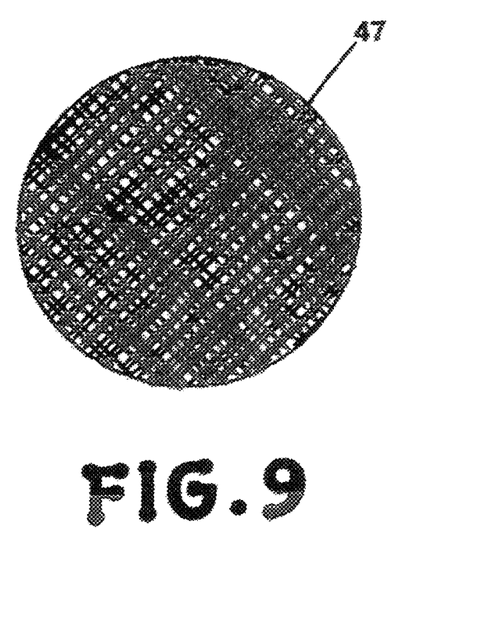
FIG. 9 is a top view of the removable screen.

Now referring to FIG. 9 which is a perspective view of a removable screen 47 and can be used for smaller food products. It fits inside the top chamber 15 or the bottom chamber 32 depending on the size of food products used.

Referring now to the operation of the vacuum chambered beverage producer 50. The vacuum control valve 33 is adjusted to a predetermined size of diameter by the consumer and then bottom chamber 32 is placed on top of receptacle 48. Tea, coffee or other food products are then placed inside of the bottom chamber 32 to a predetermined level. Then the vacuum control valve 16 is adjusted to a predetermined size of diameter by the consumer then the top chamber 15 is placed on top of the bottom chamber 32 to create a sealed chamber. Then tea, coffee, or other food products are placed inside the top chamber 15 to a predetermined level. Then place lid 11 on the top chamber 15 to create a sealed chamber. A liquid is then poured into hole 14 filling the top chamber 15 the vacuum control valve 12 is closed. The liquid will drain into the bottom chamber 32 through gravity creating a vacuum inside the vacuum chambered beverage producer which will make the food products used swell up and release nutrients and vitamins. It will then drain into receptacle 48 to create beverage 49.

The strength of beverage 49 is determined by the settings of the vacuum control valve 16, the vacuum control valve 33 and the vacuum control valve 12. The more the vacuum control valve 16 is adjusted in a certain direction the more it closes up drain holes 27, 28, 29 and 30 which will create more vacuum forces on the food products used which will increase the strength and flavor of beverage 49. The less the vacuum control valve 16 is adjusted in a certain direction the more drain holes 27, 28, 29 and 30 will be opened which will create less vacuum forces on the food products use which will decrease the strength and flavor of beverage 49.

The more the vacuum control valve 33 is adjusted in a certain direction the more it closes up drain holes 43, 44 and 45 in which will create more vacuum forces on the food products use which will increase the strength and flavor of beverage 49. The less the vacuum control valve 33 is adjusted in a certain direction the more drain holes 43, 44 and 45 will be opened which will create less vacuum forces on the food products use which will decrease the strength and flavor of beverage 49.

There are allot of different varieties of strengths and flavors that the consumer can achieve with the vacuum chambered beverage producer 50 just by adjusting the vacuum control valve 16, vacuum control valve 33 or vacuum control valve 12. The consumer can close drain holes 27, 28, 29 and 30 to a very small size and then open up drain holes 43, 44 and 45 to a very big size so the consumer can increase the strength and flavor from the food products used in the top chamber 15 and decrease the strength and flavor from the food products used in the bottom chamber 32. If the strength and flavor of the beverage 49 is too strong from the food products used in the top chamber 15 then adjust the vacuum control valve 16 to open up drain holes 27, 28, 29 and 30 to create less vacuum forces which will decrease the strength and flavor of beverage 49. If the strength and flavor of finished flavored beverage 49 is too weak from the food products used in the bottom chamber 32 adjust the vacuum control valve 33 to close up drain holes 43, 44 and 45 to create more vacuum forces which will increase the strength and flavor of beverage 49.

Once the consumer finds the desired strength and flavor for beverage 49 and the liquid stops flowing out of drain holes 43, 44 and 45 then the consumer can attach base 46 to the vacuum chambered beverage producer 50 as seen in FIG. 1 and store the vacuum chambered beverage producer 50 away for a later use. When the consumer is ready to make more beverage 49 the consumer sets the vacuum chambered beverage producer 50 onto receptacle 48 and pours more liquid into hole 14 until the food products used are stale. Once the food products used become stale that were in the top chamber 15 and the bottom chamber 32 then the consumer can discard the stale food products into the trash and add fresh food products to the top chamber 15 and the bottom chamber 32 to create more beverage 49.

The preferred embodiment of the vacuum chambered beverage producer has been described with respect to the present invention. Modifications and alterations may change any part or parts of the preferred embodiment of the present invention such as different sizes, shapes, and materials used to make any part of the invention. It is intended that all such modifications and alterations be included insofar as they come within the scope of the patent as claimed or the equivalents thereof.

What is claimed is:

1. A vacuum forming chambered beverage producer, comprising:
   a top chamber with two vacuum control valves and a bottom chamber with a vacuum control valve, said top chamber being joined with said bottom chamber;
   wherein one of the vacuum control valves in the top chamber is opened to allow for pouring a liquid into said top chamber and subsequently closed, thereby sealing the joined top and bottom chambers, said poured liquid creating a vacuum in the joined top and bottom chambers by the flow of said liquid flowing in a downward motion for infusing tea, coffee, or other beverage infusible food products when contained within said joined top and bottom chambers and wherein the other vacuum control valves are used to increase or decrease the flow of said liquid thereby adjusting the vacuum between said top chamber and said bottom chamber of said joined top and bottom chambers during said infusing of said tea, coffee, or other beverage infusible food products.

2. A method of using a vacuum chambered beverage apparatus comprising:
   providing an upper stackable hopper, a lower stackable hopper, and an upper stackable hopper lid;
   setting associated vacuum control valves in said upper stackable hopper and said lower stackable hopper;
   placing contents in said upper stackable hopper and said lower stackable hopper, said contents being tea, coffee, or other infusible food products;
   placing said upper stackable hopper lid onto said upper stackable hopper;
   joining said upper stackable hopper to said lower stackable hopper;
   pouring liquid into a hole of said upper stackable hopper lid, said hole being subsequently closed by a vacuum control valve thereby sealing the joined upper and lower stackable hoppers;
   wherein a vacuum is formed in the joined upper and lower stackable hoppers by the flow of said liquid through said joined upper and lower stackable hoppers in order to treat said contents to a vacuum infusion, the strength of said infusion being determined by the settings of said vacuum control valves in the upper stackable hopper and lower stackable hopper.

* * * * *